United States Patent [19]

Kim

[11] Patent Number: 5,636,295
[45] Date of Patent: Jun. 3, 1997

[54] APPARATUS FOR REDUCING QUANTIZATION NOISE IN IMAGE SIGNALS

[75] Inventor: Jong-Il Kim, Nam-Ku, Rep. of Korea

[73] Assignee: Daewoo Electronics Co., Ltd., Seoul, Rep. of Korea

[21] Appl. No.: 409,839

[22] Filed: Mar. 27, 1995

Related U.S. Application Data

[63] Continuation-in-part of Ser. No. 133,621, Oct. 7, 1993, abandoned.

[30] Foreign Application Priority Data

Oct. 7, 1992 [KR] Rep. of Korea .............. 92-18392

[51] Int. Cl.⁶ ..................... G06K 9/36; H04N 1/38
[52] U.S. Cl. ............... 382/251; 382/233; 348/405; 364/574; 375/254; 358/463
[58] Field of Search ................... 382/233, 251, 382/275; 348/405; 381/94; 364/574; 341/94, 143; 375/254; 358/463

[56] References Cited

U.S. PATENT DOCUMENTS

| 4,807,029 | 2/1989 | Tanaka | 358/133 |
| 4,862,263 | 8/1989 | Strobach et al. | 358/135 |
| 4,918,633 | 4/1990 | Sullivan | 364/574 |
| 5,212,764 | 5/1993 | Ariyoshi | 395/2 |

OTHER PUBLICATIONS

Wagdy, Mahmoud and Ng, Wai-man, "Validity of Uniform Quantization Error Model for Sinusoidal Signals Without and With Dither", IEEE, Jun. 1989, pp. 718–722.

*Primary Examiner*—Jose L. Couso
*Assistant Examiner*—Matthew C. Bella
*Attorney, Agent, or Firm*—William F. Pinsak

[57] ABSTRACT

An apparatus for decoding a discrete cosine transform coded image signal includes an image restoration circuit which comprises a first conversion block for converting the reconstructed image signal into its frequency domain image signal including image signal phase components and image signal amplitude components thereof; a predictive quantization noise generation block for responding to the quantization parameter and for generating a predictive quantization noise having a known probability density function; a second conversion block for converting the predictive quantization noise into its frequency domain noise including noise phase components and noise amplitude components; an adder circuit for generating compensated amplitude components representative of the difference between the image signal amplitude components and the noise amplitude components; and a inverse conversion block responsive to the image signal phase components and the compensated amplitude components for converting them to restore the image signal, free of the quantization noise, in the time domain to thereby improve the quality of the displayed image.

4 Claims, 4 Drawing Sheets

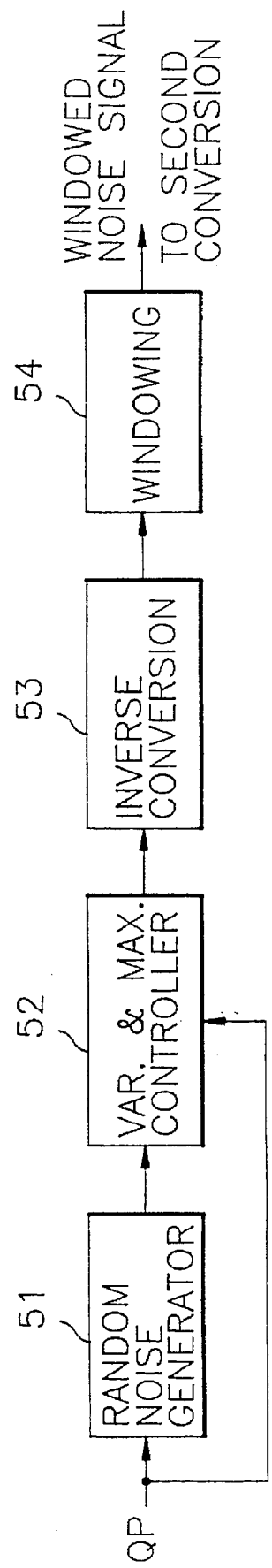

APPARATUS FOR REDUCING QUANTIZATION NOISE IN IMAGE SIGNALS

CROSS REFERENCE TO RELATED APPLICATION

This application is a continuation-in-part of U.S. Ser. No. 08,133,621 filed on Oct. 7, 1993, now abandoned.

FIELD OF THE INVENTION

The present invention relates to an image restoration apparatus for reducing quantization noises in an image signal; and, more particularly, to an apparatus for effectively restoring an image signal degraded by quantization noises in the frequency domain and thereby improving the quality of displayed image.

DESCRIPTION OF THE PRIOR ART

An image restoration apparatus has been normally used for restoring an image signal that has been degraded by noises which may have occurred during, e.g., a quantization process thereof The design or construction of such an image restoration system largely depends on the type of noises such as additive random noises or blurring. Various image restoration apparatus have been proposed in order to remove additive random noises including quantization noises from a deteriorated image signal.

One of such devices, as disclosed in U.S. Pat. No. 4,706,290, comprises a digital maximum a posteriori (MAP) filter incorporating therein a MAP estimator for estimating the signal and the noise probability density function of a video signal in the time domain. However, this and other prior art apparatus serve to reduce quantization noises introduced in an image signal which is processed in the time domain. No effective image restoration system capable of reducing quantization noises inherently introduced in a quantization process carried out in the frequency domain has yet been announced.

SUMMARY OF THE INVENTION

It is, therefore, a primary object of the invention to provide an image restoration apparatus for use in an image signal decoding system, which is capable of providing an effective reduction of a frequency domain quantization noise in an image signal to thereby improve the quality of the displayed image.

In accordance with the invention, there is provided an apparatus for decoding a discrete coaine transform coded image signal, wherein the apparatus includes means for inversely quantizing the discrete coaine transform coded image signal to generate discrete coaine transform coefficients by using a quantization parameter representative of a quantization step size used in a quantization process of the discrete coaine transform coded image signal, means for converting the discrete coaine transform coded coefficients into a reconstructed image signal, wherein the reconstructed image signal has a frequency domain quantization noise, and a frame memory for storing the reconstructed image signal to be displayed, which further includes an image restoration circuit comprising:

first conversion means for converting the reconstructed image signal into its frequency domain image signal including image signal phase components and image signal amplitude components thereof;

predictive quantization noise generation means for responding to the quantization parameter and for generating a predictive quantization noise having a known probability density function;

second conversion means for converting the predictive quantization noise into its frequency domain noise including noise phase components and noise amplitude components;

means responsive to the image signal amplitude components and the noise amplitude components for generating compensated amplitude components representative of the difference between the image signal amplitude components and the noise amplitude components; and inverse conversion means responsive to the image signal phase components and the compensated amplitude components for converting them to restore the image signal, free of the quantization noise, in the time domain, to thereby improve the quality of the displayed image.

BRIEF DESCRIPTION OF THE DRAWINGS

The above and other objects and features of the instant invention will become apparent from the following description of preferred embodiments taken in conjunction with the accompanying drawings, in which:

FIG. 4 is a detailed schematic block diagram illustrating the error modeling block shown in FIG. 2.

DETAILED DESCRIPTION OF THE PREFERRED EMBODIMENTS

Figure 1:
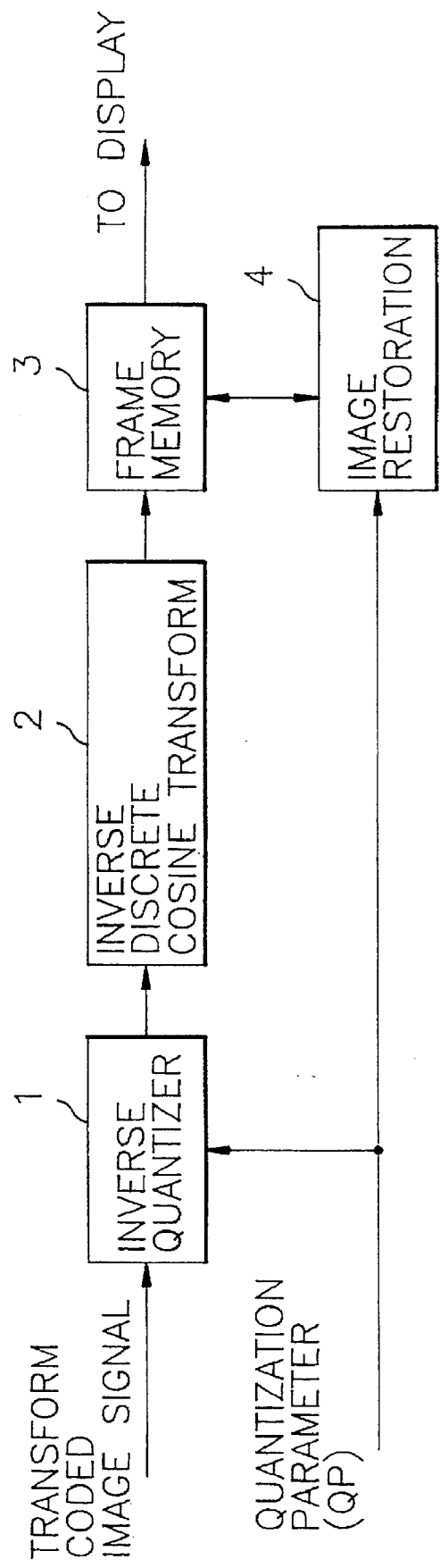
FIG. 1 is a schematic block diagram describing an image signal encoding apparatus employing an image restoration circuit in accordance with the present invention.

Referring to FIG. 1, there is provided an image signal decoding system employing an image restoration circuit in accordance with the present invention. The image signal decoding system includes an inverse quantization circuit 1, an inverse discrete coaine transform circuit 2, a frame memory 3 and a image restoration circuit 4.

A transform coded image signal from an encoding system (not shown), which employs a known discrete coaine transform and quantization technique, is coupled to the inverse quantizer 1 which serves to convert the transform coded image signal to a transform coefficient signal by using a quantization parameter (Qp). The Qp representative of the quantization step size has been employed in the quantization process of the encoder and is also coupled to the decoding system together with the transform coded image signal. The transform coefficient signal is then coupled to the inverse discrete coaine transform circuit 2 wherein the transform coefficient signal is converted into the reconstructed image signal which is coupled to the frame memory 3 for display thereof.

In accordance with the present invention, the reconstructed image signal, prior to being displayed, is coupled to the image restoration circuit 4 in order to reduce a frequency domain quantization noise which has been added to the reconstructed image signal during the quantization process of the encoding system. The image restoration circuit 4 serves to convert the reconstructed image signal into a restored image signal which is coupled via the frame memory 3 to a known display (not shown), thereby improving the quality of the displayed image.

Figure 2:
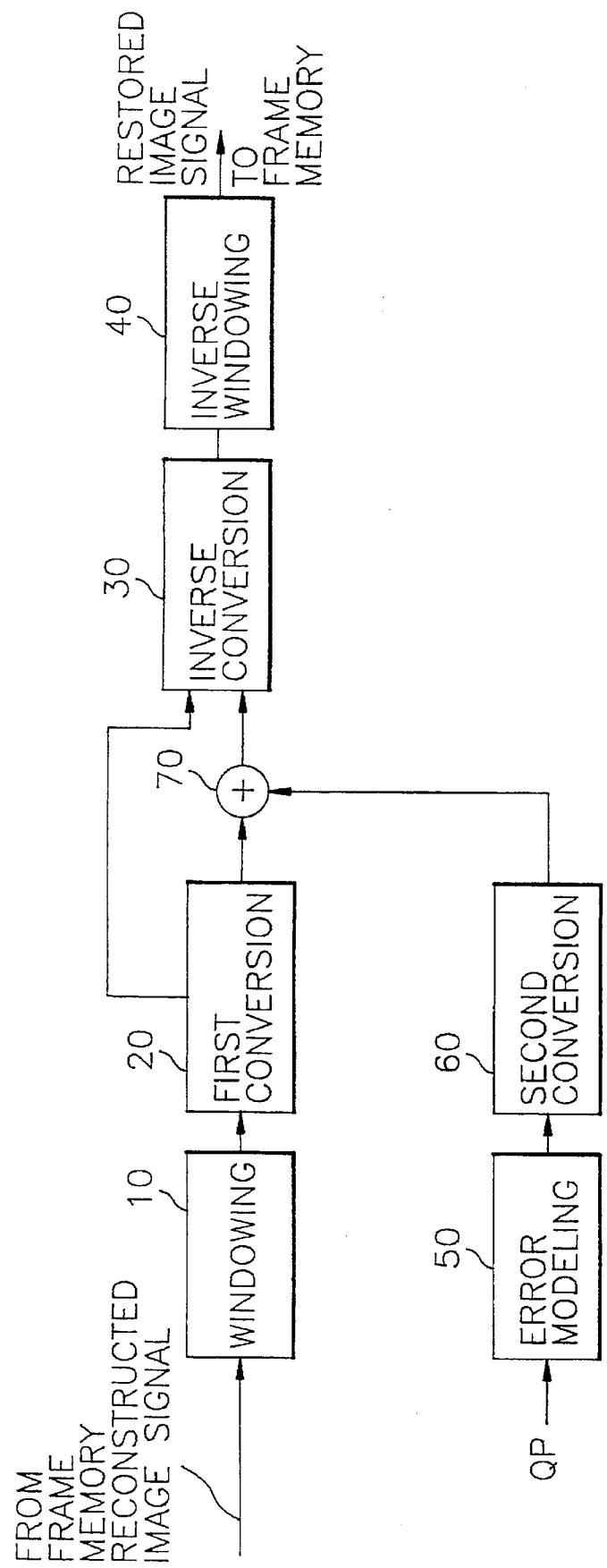
FIG. 2 is a schematic block diagram showing the image restoration circuit of FIG. 1.

Referring to FIG. 2, the image restoration circuit 4 includes a windowing block 10, a first and a second conversion blocks 20 and 60, an inverse conversion block 30, an inverse windowing block 40 and a error modeling block 50.

The reconstructed image signal, which has been contaminated with a frequency domain quantization noise during the quantization process taken place in the frequency domain, employing a quantization parameter (Qp) representative of the quantization step size, is coupled to the windowing block 10 which serves to divide the image signal into a number of subimage signals for subsequent processing thereof in the image restoration circuit 4. This division is achieved by multiplying the image signal with a known window weight factor.

The divided subimage signals are sequentially coupled to the first conversion block 20 wherein the divided subimage signals are converted into their frequency domain subimage signals through the use of a known Fast Fourier Transform (FFT) circuit. Each of the frequency domain subimage signals includes phase components and amplitude components. The phase components are directly coupled to the inverse conversion block 30, while the amplitude components are coupled through an adder circuit 70 to the inverse conversion block 30.

On the other hand, the afore-mentioned quantization parameter (Cp) is coupled to the error modeling block 50 which is adapted to generate a windowed noise signal in accordance with a known noise probability density function (pdf) which varies with the quantization parameter (Qp). The windowed noise signal is coupled to the second conversion block 60 which is adapted to convert it into the frequency domain noise signal through the use of a known Fast Fourier Transform (FFT) circuit, which includes noise phase components and amplitude components. The amplitude components of the converted noise signal are then negatively coupled to the adder circuit 70.

The adder circuit 70 is adapted to negatively combine the subimage signal amplitude components signal and the corresponding noise amplitude components to generate compensated amplitude components representative of the difference therebetween.

The compensated amplitude components are then coupled to the inverse conversion block 30 which is adapted to combine the compensated amplitude components and the subimage signal phase components to generate a compensated frequency domain subimage signal through the use of a known inverse FFT circuit. The compensated frequency domain subimage signal is coupled to the inverse windowing block 40 which serves to receive and convert the compensated subimage signals sequentially into a restored full image signal in the time domain by multiplying each subimage with a weight factor.

Figure 3:
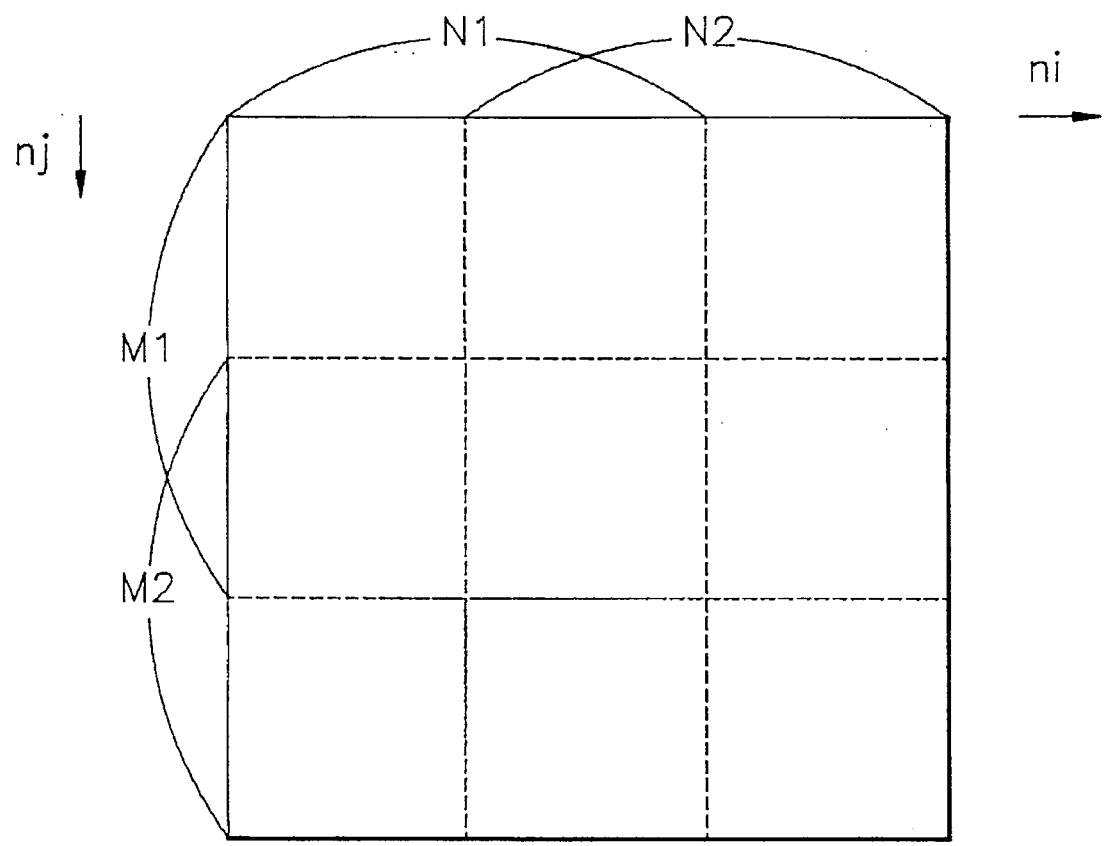
FIG. 3 is a schematic diagram depicting the division process of an image signal for the processing thereof by using the image restoration apparatus of FIG. 2.

Referring to FIG. 3, assuming that a reconstructed image signal is a two-dimensional signal designated as g(nl, nj), an image signal g(nl, nj) as partitioned into a plurality of subimages. Each of the subimages is processed separately and then combined with others. The size of a subimage defined as U×M, in a preferred embodiment, may lie between 8×8 and 32×32, and is identical to that of a macro-block used in the quatization process of the encoding system. For each subimage, there is chosen a space-invariant operation parameter appropriate to the subimage on the basis of the local characteristics thereof, i.e., the quantization parameter (Qp). Because the subimage-by-subimage processing employs space-invariant operation parameters, it has a greater flexibility than a pixel-by-pixel processing.

In addition, the subimage-by-subimage processing is computationally less expensive than the pixel-by-pixel processing for the whole subimage.

Because the subimage-by-subimage processing changes abruptly as it is moved from one subimage to another, however, artificial intensity discontinuities may appear along the boundaries of adjacent subimages in the processed image. This is called the blocking effect. As is shown in FIG. 3, therefore, the subimages are made overlapping, e.g., N1×M1 and N1×M2, to reduce the blocking effect. In a preferred embodiment, the subimages, which overlap with their neighboring subimages by half the subimage in each dimension, are advantageously employed at the windowing block 10.

Referring now to FIG. 4, the error modeling block 50 includes a random noise generator 51, a variance and maximum amplitude controller 52, an inverse conversion block 53 and a windowing block 54.

The quantization parameter (Qp) is coupled to the random error generator 51 which is adapted to respond thereto and generate a frequency domain random noise signal based on a noise probability density function (pdf). The random noise signal generator 51 may be implemented by using a look-up table which stores the random noise data.

As is known in the art, the quantization noise data is a priori calculated by using a noise probability density function (pdf) corresponding to each of the quantization parameters, and stored in a look-up cable memory and accessed by each of the quantization parameters to be converted into the frequency domain quantization noise signal. The predictive frequency domain quantization noise signal is then coupled to the variance and maximum amplitude control block 52 wherein the variance and the maximum amplitude thereof are controlled on the basis of the quantization parameter (Qp). In a preferred embodiment, the variance is set to Qp/10 and the maximum amplitude level is set to Qp/2.

Under this scheme, the predictive frequency domain quantization noise signal is precisely controlled; and, therefore, the predictive frequency domain quantization noise closely approximates the actual frequency domain quantization noise.

The predictive frequency domain quantization noise is then coupled to the inverse conversion block 53 which serves to convert the predictive frequency domain quantization noise into the predictive time domain quantization noise by using the Inverse Discrete Cosine Transform (IDCT) circuit which is identical to that used in the encoding system. The predictive quantization noise signal is, then, divided into subnoise signals identical to the subimage signals in terms of their dimension at the windowing block 54.

As is described above, the predictive quantization subnoise signal is coupled to the second conversion block 60 which serves to convert the predictive quantization subnoise signal into the frequency domain quantization subnoise signal. The amplitude components of the frequency domain quantization subnoise signal are then coupled to the adder circuit 70 which is adapted to negatively combine the subimage amplitude components and the corresponding subnoise amplitude components and to generate the compensated amplitude components representative of the difference therebetween.

As may be seen from the above, it can be readily appreciated that output from the inverse conversion block 30 shown in FIG. 1 are the restored subimage, free of the quantization noise, in the time domain and the restored subimage combined into restored full image signal at the inverse windowing block 40, thereby improving the quality of the displayed image.

While the present invention has been shown and described with reference to the particular embodiments, it will be apparent to those skilled in the art that many changes and modifications may be made without departing from the spirit and scope of the invention as defined in the appended claims.

What is claimed is:

1. An apparatus for decoding a discrete cosine transform coded image signal, which includes means for inversely quantizing the discrete cosine transform coded image signal to generate discrete cosine transform coefficients by using a quantization parameter representative of a quantization step size used in a quantization process of the discrete cosine transform coded image signal, means for converting the discrete cosine transform coded coefficients into a reconstructed image signal, said reconstructed image signal having a frequency domain quantization noise, and a frame memory for storing the reconstructed image signal to be displayed, characterized in that said apparatus further includes an image restoration circuit comprising:

first conversion means for converting the reconstructed image signal into its frequency domain image signal including image signal phase components and image signal amplitude components thereof;

predictive quantization noise generation means for responding to the quantization parameter and for generating a predictive quantization noise having a known probability density function;

second conversion means for converting the predictive quantization noise into its frequency domain noise including noise phase components and noise amplitude components;

means responsive to the image signal amplitude components and the noise amplitude components for generating compensated amplitude components representative of the difference between the image signal amplitude components and the noise amplitude components, and inverse conversion means responsive to the image signal phase components and the compensated amplitude components for converting them to restore the image signal, free of the quantization noise, in the time domain to thereby improve the quality of the displayed image.

2. The apparatus as recited in claim 1, wherein the predictive quantization noise generation means includes error modeling means responsive to the quantization parameter for converting the quantization noise into a set of Discrete Cosine Transform coefficients having a known probability density function; means responsive to the quantization parameter for controlling the variance and the maximum amplitude level of the probability density function; and inverse conversion means for converting the set of Discrete Cosine Transform coefficients into the predictive quantization noise.

3. The apparatus as recited in claim 2, wherein the image restoration circuit further comprising windowing means for dividing the image signal into a plurality of subimages for subimage-by-subimage processing, and inverse windowing means for combining and restoring the processed subimages from the second conversion means into the whole image signal, and wherein the predictive quantization noise generation means further includes means for dividing the predictive quantization noise into a multiplicity of predictive quantization subnoises, each having a size identical to that of the subimage signal.

4. The apparatus as recited in claim 3, wherein the variance is determined as the quantization parameter divided by 10.

* * * * *